Figure 23:
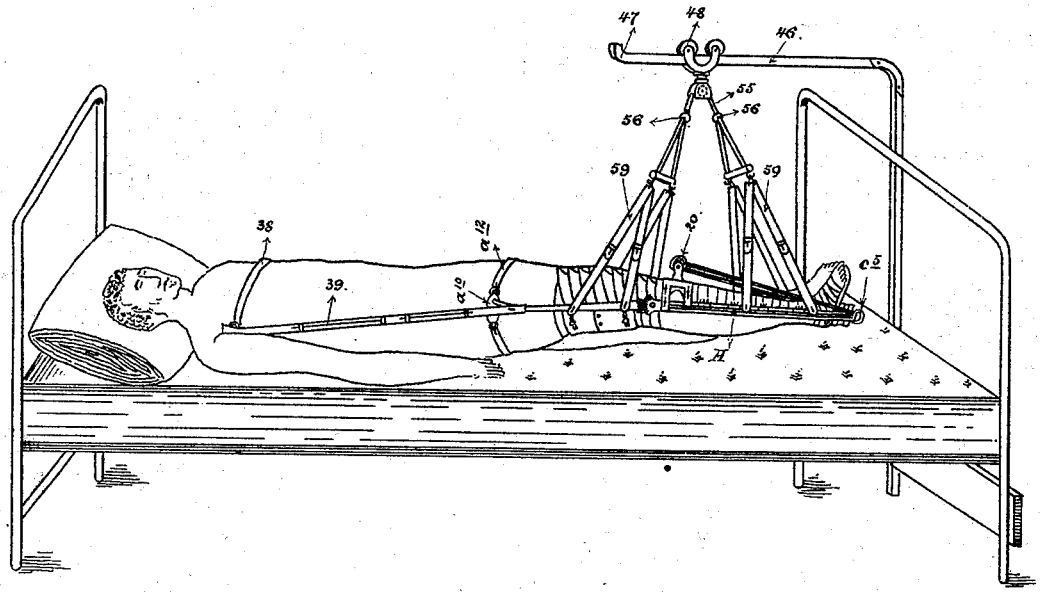

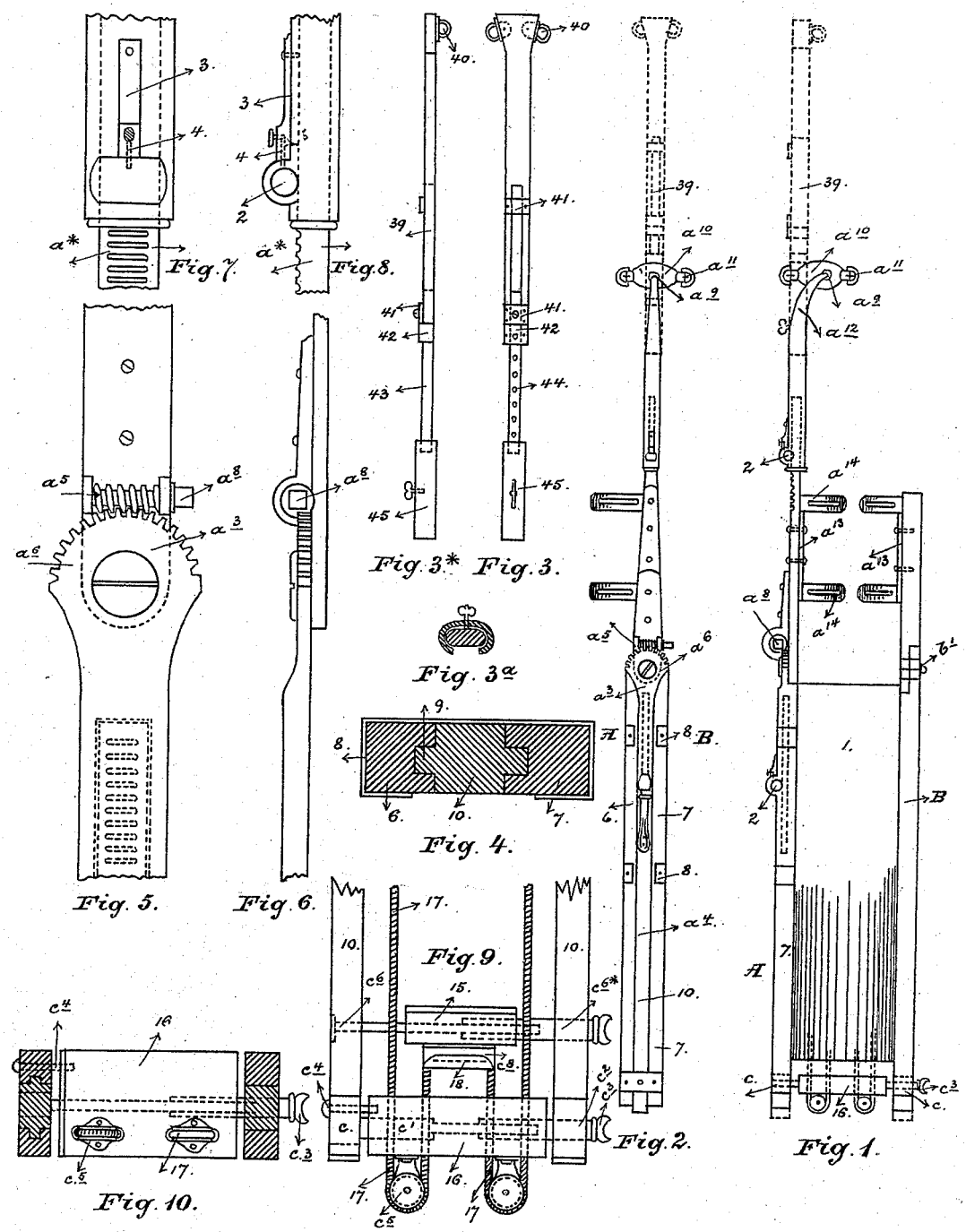

(No Model.) 3 Sheets—Sheet 2.
J. T. BERGHOFF.
FRACTURE APPARATUS.
No. 505,382. Patented Sept. 19, 1893.
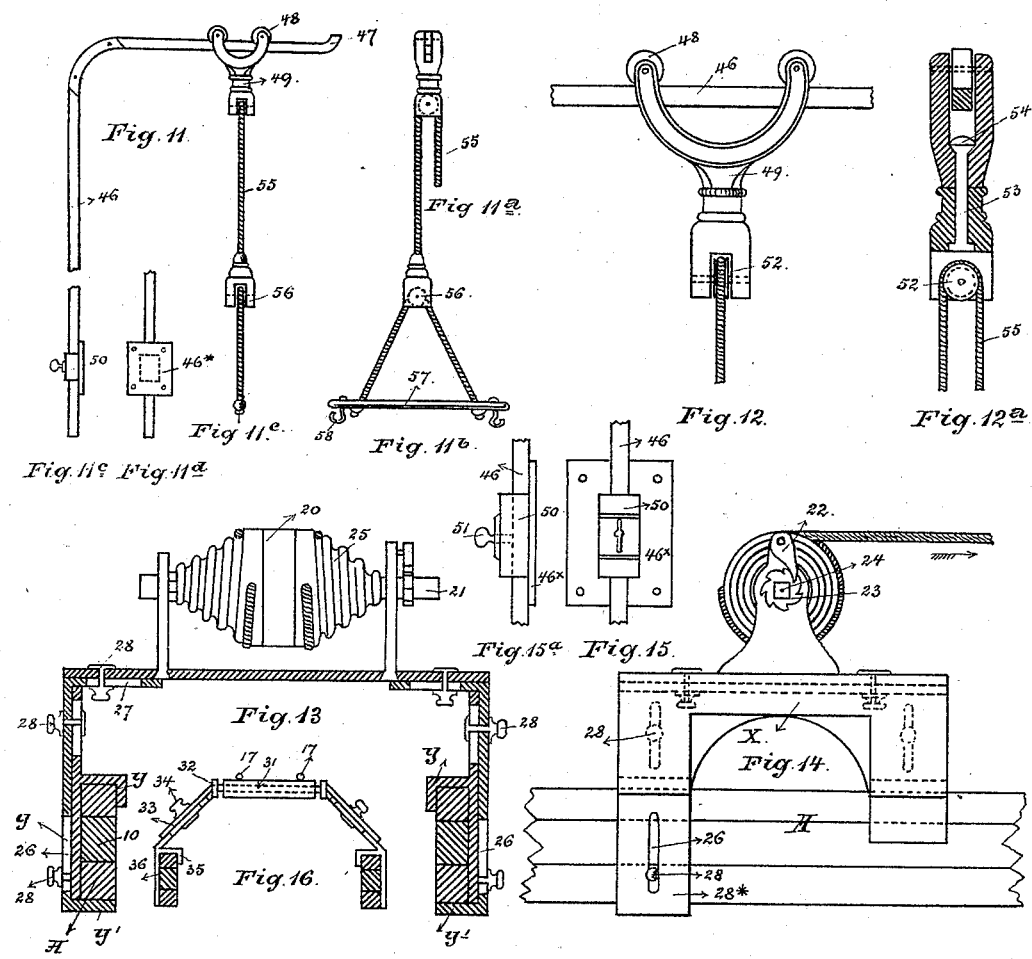
Witnesses:
Claude Kesler
H. A. Batch
Inventor
John T. Berghoff
per
John J. Halsted & Son
his Attorneys.

(No Model.) 3 Sheets—Sheet 3.
J. T. BERGHOFF.
FRACTURE APPARATUS.

No. 505,382. Patented Sept. 19, 1893.

Witnesses:
Claude Kessler
Sb. A. Balch

Inventor:
John T. Berghoff
per
John J. Halsted Son
His Attorneys.

UNITED STATES PATENT OFFICE.

JOHN T. BERGHOFF, OF ST. JOSEPH, MISSOURI.

FRACTURE APPARATUS.

SPECIFICATION forming part of Letters Patent No. 505,382, dated September 19, 1893.

Application filed August 29, 1892. Serial No. 444,432. (No model.)

*To all whom it may concern:*

Be it known that I, JOHN T. BERGHOFF, of St. Joseph, in the county of Buchanan and State of Missouri, have invented certain new and useful Improvements in Surgical Leg-Splints; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of devices used in surgery, for the purpose of holding fractured or dislocated lower limbs firmly and fixedly in the position considered by the attending physician-surgeon as best adapted for the proper joining of the fractured bones, and for the healing of the muscles and flesh surrounding the same.

The object of my invention is to provide an apparatus at once strong, simple, in construction, light and durable; by means of which a fractured or dislocated limb may be held in the proper position for healing, without being brought in contact with the bed or couch on which the patient may be lying, or with any object connected therewith, which shall suspend the fractured limb free from all surrounding objects; hold the same firmly and gently in such proper position; provide for extension, and counter-extension; and at the same time enable the patient to be in any position he may choose, or move about his bed at pleasure, without in any manner impairing or affecting the injured limb.

The apparatus is so constructed that its parts are reversible, so that it may be applied either to a right or to a left leg.

My present invention consists of two leading parts, which work together, to-wit: the splint, and the suspension device. The splint device consists in part of an outside splint, which may be constructed partly of steel, and partly of wood, or of steel altogether. This splint is intended to be attached to the outside of a fractured or dislocated leg, extending from a point below the bottom of the foot to the hip. It is so arranged that the two extensions, and counter-extensions may be lengthened or shortened by means of racks working in hollow shafts, and operating by a key, so constructed that when inserted into the key-hole provided for that purpose, its cogs mesh with the rack-cogs and operate the rack forward or backward. By this means the splint is adjusted to any length of limb, and firmly held at that length by spring detents arranged to engage the rack cogs at any point and lock them, by means of a catch-bolt arranged to slide into the key-hole buttress. The upper end of said outside splint is curved to fit over the point of the hip and terminates in a hip-pad which is attached to the splint by a ball and socket joint, so that it may move easily and freely in any direction. The opposite ends of this hip pad are provided with buckles or rings, through which bands may be passed around the upper part of the patient's thigh, and fastened. The center of the outside splint or rack and worm-wheel joint is so made that the upper and lower ends may be made to form any angle required. To form this joint the lower splint is made to terminate at the upper extremity in a semi-circular rack having an arc of one hundred and eighty degrees. The upper portion of the splint is here joined to the lower by a pivot allowing free motion in any direction, and to any extent. On the lower end of the upper splint a bracket is provided and removably attached to the upper splint by screws. Bearings are formed in said bracket which support the opposite ends of a worm wheel, the teeth of which mesh in and engage at right angles, the cogs of the semi-circular rack on the upper end of the lower splint. A hollow or female key is provided to fit over the squared end of said worm-wheel by means of which the worm-wheel and rack are operated in either direction, and set at any required angle; the engagement of the worm-wheel with the rack, forming a firm and stiff joint. This worm-wheel and in fact all parts of the apparatus may be removed and reversed at pleasure so as to fit either the right or left leg of a patient. The lower end of said outside splint is constructed in three parts—the two outer pieces having grooves on their inner surface, and being held firmly together by box clamps and screws. The inner part is constructed with a shoulder and tongue on either side adapted to fit, and work in the grooves in the outer pieces above named. This inner part being attached to the end of the metal telescopic rack above described moves with it either in or out, and may be extended any distance required beyond the ends of the outer or fixed portions of said splint. The inside splint is constructed of wood or other suitable material, and with a simple joint connecting the upper and lower halves, and is movable in any direction. The lower half is also constructed in three parts so arranged that the inner part or core will move freely in or out, when connected, and in concert with the outer splint, the two outer parts being held firmly by clamps and set screws.

Figure 24:
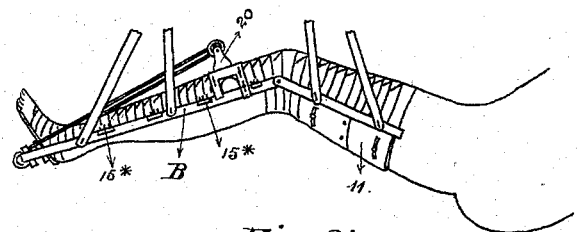
Figure 25:
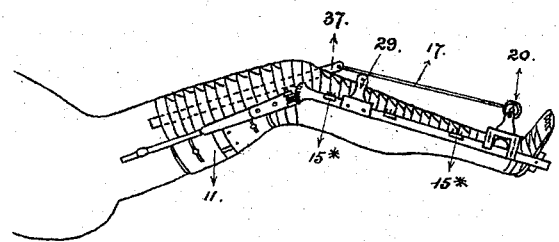

Referring to the accompanying drawings forming a part of this specification, in which similar letters of reference indicate corresponding parts in all the drawings: Figure 1. is a top view of my novel device, showing the outside and inside splints with their attachments—the same being reversible, and interchangeable; the dotted lines therein show also the position of the upper or body splint, when the same is attached to the leg splints: the position of the canvas sling for supporting the limb, between the outside and inside leg splints, is also shown in this figure. Fig. 2. is a side view of the outside splint showing the knee joint—the dotted lines therein indicating the position of the body splint when the same is attached. Figs 3, and 3* show respectively a top view and a side view of the body splint, and also a detail (Fig. 3$^a$) showing in cross-section the open clamp used to attach the same firmly to the leg splint. Fig. 4. is an enlarged sectional view, through the line A. B. of Fig. 2, showing the telescopic construction of the lower portion of said leg splint, the same being applicable to both outside and inside splints. Figs. 5 and 6 are detailed enlarged views through the line B. B. of Fig. 2, showing the knee joints in plan and edge views respectively. Figs. 7 and 8, respectively are enlarged details through the line A. A. of Fig. 2, showing plan and edge views of the racks and detent used to lengthen or shorten the upper portion of the leg splint. Fig. 9, is a view of the foot piece used in my novel device, and to which I attach the extension drum hereinafter described. Fig. 10. is an under side view of the same, showing pulleys. Figs. 11—11$^a$—11$^b$—11$^c$—11$^d$. and 11$^e$— show the details of construction of the suspension device, and Figs. 12 and 12$^a$ enlarged side and sectional views respectively of the suspension rollers; a portion of the suspension bar, and the swivel joint mechanism allowing the suspension cords to be moved in any direction. Fig. 13. is an enlarged view of the extension drum, showing also in sectional view the method of its attachment to the outside and inside splints; and also the slotted parts, by means of which the length and breadth of the drum structure may be increased or diminished, as need be. Fig. 14. is a side view also enlarged of said extension drum, and connections, showing a portion of the side splints broken away. Figs. 15 and 15$^a$. show back and side views of the device for fastening the suspension bar to a bed or couch. Fig. 16. is a view partly in section, of my extension bridge, and showing the manner of attaching the same to the side splints. Fig. 17. is a plan view, of my thigh piece; Fig. 18. a sectional view along the line x. y. of Fig. 17, of the thigh piece. Figs. 19. 19*. and 20 show in elevation and in end views, the key used to operate the various parts of the device. Figs. 21. and 22. are sectional and top views of the hook-box for attaching the canvas leg-sling to the splints, as the same appear when in use. Fig. 23. is an outside view on a much reduced scale of the apparatus as applied to a fracture of the lower limb, showing the parts in position, and the limb suspended above the couch or bed. Fig. 24. is a view of the inside splint and attachments when in use for the treatment of fracture of the lower limb. Fig. 25. is an outside view of the leg splint when in use for the treatment of a fracture of the lower third or middle third of the thigh bone, showing the adhesive straps, extension bridge, and extension drum, reversed as hereinafter described.

A. is a splint adapted to fit and be adjusted to the outside of the leg or lower limb, extending upward to the hip joint. It may be constructed of steel, or partly of steel and partly of wood, or of any other suitable material. Said splint is reversible in all its parts, as hereinafter described, so that it may be used on either the right or left limb, with equal facility, and adjustable in manner hereinafter described, so that it may be fitted and adapted to any length of limb.

Fig. 1. is a top view of both the outside and inside splints, without the thigh supports, hereinafter described, and showing the canvas sling 1, which is attached to both outside and inside splints, as hereinafter described. The outside splint A. extends from $a$ to $a'$. It is constructed of steel from the end $a$ to the point $a^2$ where it is connected by set screw bolts with the wooden lower section $a^4$. The two parts of the splint are connected at $a^3$ by a worm-wheel joint $a^5$ shown more distinctly in Figs. 5 and 6—this worm-wheel engaging with the curved rack $a^6$. This joint is operated by placing the hollow square end $a^7$ of the key (see Figs. 19 and 20), over the worm-wheel stud $a^8$, when, by turning the worm-wheel, the joint may be set at any angle. This rack has an arc of nearly one hundred and eighty degrees. The upper end of the outside splint terminates at $a$ in a ball and socket joint $a^9$ in a hip pad $a^{10}$ provided with buckles $a^{11}$ at each end, through which straps or bands pass around the upper part of the thigh, holding the pad, and with it the upper end of the splint firmly against the outside of the hip, a curve $a^{12}$ being made in the splint so that the end of the splint may fit over the hip joint. The upper section or member of this splint is hollow, and contains within it a rack $a^*$ (see Figs. 7 and 8), which moves in and out of this hollow shank, and may be operated by inserting the cogged end $k$ of the key (see Figs. 19 and 19*) in the keyhole 2, when its cogs immediately engage the teeth of the rack, and by turning the key either way, the upper end of the splint may thus be lengthened or shortened. When adjusted, the spring detent 3, is brought to bear, by sliding its adjustable bolt 4, as need be, when the tooth 5, is forced between the cogs of the rack, firmly locking the shank to the rack. The lower half of the splint is constructed in three pieces, the outer two, 6 and 7, of which are held together by clamps 8 and grooved on their inner sides to receive corresponding shoulders, or tongues 9, cut on the center pieces 10 (see Fig. 4). When the key is inserted in keyhole 2, and turned in the proper direction, the rack is forced outward and carries with it the sliding center piece 10, to which it is firmly fastened. The inside splint "B" is constructed of wood. It is provided with a simple pivot joint at $b'$. The upper portion is constructed of one solid piece. From the joint $b'$ it is constructed in the same manner as the corresponding part of the outside splint; that is, in three parts, 6, 7 and 10, the center part 10 moving freely between the outer parts 6 and 7; but it has no extension rack, for the reason that when in use it is connected with the inner portion of the outside splint, and the extension or shortening of the outside splint carries the inside one with it. A steel plate $a^{13}$ (see Fig. 1) is screwed to the inside of the outer splint, and it has two curved and slotted tongues or bands $a^{14}$. The inside splint has the same fixture exactly, except that the curves are in the opposite direction. These bands are intended to pass under the thigh, and serve as supports to a thigh piece 11 (see Figs. 17 and 18). Slotted openings 12, are shown in Fig. 17, corresponding to the slots in the tongue $a^{14}$ in Fig. 1. This thigh piece is intended to be attached to the upper side of the curved bands $a^{13}$ by means of set screws passing through the slots in the thigh piece and those in the bands, so that the apparatus may be adjusted to any size of thigh. This thigh piece may also be increased in length by means of a longitudinal slot 13, and thumb screw 14, as applied in Figs. 23 and 24, Sheet 3. I provide brass caps or grooved pieces 15* which fit closely on the edges of the splint and which have a number of hooks. A number of these caps are provided, say three or four to each side of splint, and to them is attached a canvas sling or hammock, intended to be fitted under and to support the lower leg, between the outside and inside splints, so that it may lie easily and freely and not be compressed or restricted. These hooks and canvas supports are shown in Figs. 23 and 24.

Referring to Figs. 9 and 10, it will be seen that between the splints A and B, there are provided two foot pieces 15 and 16. The piece 16, is fixedly attached to the ends of the splints A and B by boxes $c$ fitting over the ends of said splints, and by a male screw bolt $c'$ and female screw $c^2$ operated by the thumb screw $c^3$, and further held rigid by a bolt $c^4$ passing through the upper piece of the outside splint and into a socket provided therefor in piece 16. The footpiece 16, is also provided on its outer side with two pulleys $c^5$ fastened with screws to the piece 16, and holes are made through this piece for the passage of extension cords 17, described farther on. The inner foot-piece 15, is attached to the movable sliding center pieces 10 of the splints, by means of a male and female screw $c^6$—$c^{6*}$ by which the rigidity of the splint is regulated, and it moves freely upward or downward with said movable center pieces. On its under or outer side, it is provided with a hook 18, secured to it with screws as shown and over which is passed the extension cord 17, hereinafter described. When a tension is put on this cord (passing over the pulleys $c^5$ through the holes in piece 16, and passed over the hook 18.) the tendency is to pull piece 15 down toward 16 with great force—this piece 16, being rigidly attached to the fixed portions A. B. of the splints; while the piece 15, is adjustably attached to the inner and movable parts 10, of the splints.

On Sheet 2, Figs. 13 and 14, are represented what is called the extension-drum 19, and which is shown fully in place in Figs. 23 and 24 and as reversed in Fig. 25. It consists of a flat spring 20, secured at its inner end to and coiled around a shaft 21, and held to its adjusted coiled position by a dog 22, and ratchet 23, at one end of the shaft, and this spring can be coiled to any tension desired by turning the shaft which terminates in a square stud 24, so that it may be operated to wind the spring, by means of the key (Fig. 19.), whose hollow shank $a^7$ fits the stud. The drum has each of its ends conical and provided with spiral grooves or gutters 25, to accommodate the extension cords 17. Referring to Fig. 13, it will be seen that the iron, or steel base work or frame X. by which this drum is attached to the splints, is slotted vertically at 26, and horizontally at 27, and provided with set screws at 28, and that in fastening it to the splints the vertical sides of this frame can be extended so as to pass over and around the splints and inclose them in a box clamp $y, y'$. By means of a horizontal slot the extension frame may also be widened to accommodate any size of limb.

Any method of attaching the drum to the splints except by a clamp bearing above and below, would put such a lateral pressure on the splints that they would not work. The box clamp around the splint and connecting the extension drum with it, is only on the upper side that is next the knee.

The tension of the device when applied to a fracture of the lower limb, is between the extension drum and the foot pieces, so that the side of the drum frame next the foot simply rests on the top of the splint, and is not fastened to it.

In Fig. 14, is shown a shoulder to fit on top of the splint, and a side piece extending down on the outside to prevent any lateral wrench of the drum.

Fig. 23, illustrates my invention when used for a fracture of the lower limb, and after the fracture or dislocation has been reduced, and the bones brought into the proper position for healing, it being then necessary that they be kept in precisely that position, and for that purpose a certain tension must be brought to bear on the limb; but it should be just enough to keep the broken bones, which have been set, from re-dislocating, or passing each other or getting out of place. This is called the "extension." The limb is thoroughly bandaged and placed between the splints, (not fastened to them,) but simply supported by the thigh piece before described, and by the canvas sling or hammock, not necessary to be shown. The worm-wheel joint $a^5$—$a^6$, is adjusted at the required angle, the inner splint following the motion of the outer. The extension drum is then adjusted, bearing on both splints over the leg, but not touching it. The cords 17, are brought down through the holes in the inner and outer foot pieces (see Fig. 9), around the pulleys $c^5$ through the inside holes in the outer footpiece 16, and passed over the hook 18. The inner footpiece 15, is attached to the sole of the patient's foot by bandages or other means, and the extension drum keyed up to the proper tension. The result of this operation is as follows: The outside footpiece being fixed on the ends of the splints, the inside footpiece is adjustably attached to the movable parts of the splints; the tension on the extension cord pulls the inner footpiece downward toward the outer footpiece, and with it the movable parts of the splints, and when in connection with the detent on the outer splint, holds the limb firmly in the required position. The upper part of the splint resting on the hip joint, and being fastened around the thigh renders the whole limb from the hip to the foot, rigid and immovable. Upon contracting the extension of the movable center splints by means of the rack $a^{13}$, and relaxing or increasing the tension of the extension cords, the strain on the limb may be regulated at the will of the surgeon.

Figure 24 shows the structure and position of the inside splint with the extension apparatus in position—being the reverse of Fig. 23, and it also shows the position and connection of the suspension cords hereinafter described.

In Fig. 25, the fracture is assumed to be in the thigh bone, and in consequence, the "extension" (so-called) must be in the opposite direction from that shown in Figs. 23 and 24. The extension drum is therefore reversed (as shown) and attached to the splints near the foot, with its tension or pull in the direction of the knee. A bridge 29 (see Figs. 16 and 25) is provided, and attached to the splints just below the knee. The top of this bridge consists of a round bar 30 (see dotted lines in Fig. 16), which is covered by a sleeve 31, revoluble thereon, and held in place by shoulders 32, formed on either side. The slanting sides 33, are slotted, and double, and being provided with set screws 34, may be lengthened or shortened so as to adjust the bridge to any desired width between the splints. As there is no strain on the bridge, it is simply adjusted to the splints by a box cap 35, fitting on the sides of the splints, and a side piece 36, extending to the under side of the splint like the cap marked $y$, in Fig. 13, and provided with a set screw. When the apparatus is used as in Fig. 25, "adhesive straps" 37, one on each side of the thigh (see Fig. 25) are attached to the thigh under the bandages, with their lower ends protruding near or at the knee. In order to have a straight pull on these adhesive straps, the extension bridge (Fig. 16) is attached, and the extension cords 17, passed over it, resting on the revoluble sleeve 31, and fastened to the ends of the adhesive straps. The tension is then applied as described before, by keying up the extension drum. In cases of dislocation of the hip joint, or intercapular, or fracture of the neck of the femur, or fracture of the upper third of the thigh bone, it is necessary that the splint should be continued to the armpit, and fastened by a breast strap 38. For that purpose I have devised a body splint 39, shown as in operation in Fig. 23, and which when attached to the leg splint, constitutes a continuous rigid splint from the foot to the armpit. At Figs. 3. and 3*, Sheet 1, are shown an edge view and a plan view of this body splint, and the dotted lines at the top of Figs. 1 and 2, show it in position. It is constructed of wood. Its upper end is widened and furnished with rings 40, adapted to receive the straps 38, which pass around the body (see Fig. 23) and fasten the splint firmly to the side. It is so constructed with guides, that the lower portion slides into the upper one, working in grooves in substantially the same manner as in the lower parts of the leg splints. Fig. 3. shows the lower part as extended nearly the full length of the lower half. The bifurcated part of the upper half is reinforced with brass plates 41, 41, somewhat as in the wooden portion of the leg splint, in order to give the necessary strength, and is capped at the lower end by a metal box 42, through which the sliding or movable part passes. The lower or sliding portion 43, is provided with a number of holes 44, through which, when adjusted, a set screw 45', passing also through a brass plate 41, holds it firmly in position. The position is changed by taking out the screw and inserting it in another of these holes.

In Fig. 3$^a$ is shown a sectional view of the device for attaching the body splint to the leg splint. It consists of an elongated open sleeve or sliding box 45, having a set screw, and which is passed over the small portion of the shank of the leg splint (curve $a^{12}$ therein allowing this to be done), over the hip pad and then sliding down, until the open sleeve fits the shank, and it is then firmly fixed by setting the thumb screw.

The other or suspensory part of my invention may be easily understood from the drawings. Its object is to suspend the injured limb so that it shall not come in contact with the bed, and also that the patient may move his body freely, and change his position lying on either side without wrenching his leg or bringing it in contact with any object. For these purposes a steel bar 46, is provided, with an elbow (see Figs. 11, 12, and 23) the end 47, of the rollers 48, of a trolley 49, working on it. The bar 46, is fastened to the foot of the bed by a plate 46* which is secured thereon, which plate is provided with a box, 50, on its outer side, having both ends open, through which the vertical part of this suspension bar is passed, and secured at any desired height by setting the thumb screw 51. Fig. 12. is a side view of this trolley arrangement, consisting of a frame within the two wheels 48, working along the upper side of the suspension bar 46, and also a sectional view of the same. The lower part which contains the pulley 52, holding the suspension cords, is attached to a shaft 53, passing up through the center of the upper part of the trolley and terminating in a pivot or swivel joint 54, which permits the lower pulley to turn freely in any direction. A cord 55, is passed around this pulley, to each end of which is attached another pulley 56 (see Figs. 11, 11$^b$, and 23). A cord is also passed around each of these pulleys 56, and passed through the holes in the opposite ends of a bar or gambrel 57 (see Fig. 11$^b$), and there knotted or secured. The ends of each of these bars 57, are furnished with hooks 58, to which, by similar hooks or eyelets are suspended two straps 59, which in turn are attached to the outside and inside splints by hooks, to the bars 57—each of these bars and its straps being held above and across the limb; one of its set or series of straps being attached at or above the knee, and the other set near the foot (see Fig. 23). By this arrangement the patient may be moved in any direction, and may lie in any position; or the injured limb may be raised entirely from the bed, without in any manner affecting it; bearing in mind that while not being tightly confined between the splints, but simply suspended between them, the foot is rigidly attached to the inner footpiece 15, and with a tension put on the extension-drum sufficient to retain it so that no movement of the bones can take place.

At Figs. 19, 19*, and 20, is shown the key by which the apparatus is attached. Fig. 19*, indicates the end of the cogged or male shank, which is inserted to operate the covered racks. Fig. 19 shows a side view of the whole key, the handle of which constitutes a screw driver 19$^c$—and Figs. 19 and 20 show at $a^7$ the hollow or female shank $a^7$, intended to pass over and fit the worm-wheel shaft $a^8$, and also to fit one end of the extension drum shaft 21.

Figs. 21 and 22 show respectively, sectional and top views of the hook boxes. These may be made in sections of various desired lengths; and placed at intervals along the top of the outside and inside splints, as desired by the surgeon and they are held by frictional contact on the splints.

I claim—

1. In combination with a splint for lower limbs, the drum conically grooved at its ends to receive and wind both ends of a cord, a frame supporting such drum and adapted to be adjustably applied to the inner and outer legs of the splint, and to be reversed thereon as and for the purposes set forth.

2. In combination with the double-cone drum its interior spring, its winding shaft, its ratchet and pawl as set forth; a cord 17, foot-piece 16, and its guide pulleys $c^5$, movable foot piece 15, and its hook 18, all substantially as and for the purposes set forth.

3. In combination with the drum, its frame and cord, and with the foot pieces 15, 16, the sliding splints 10, applied to be moved lengthwise between the fixed parts 7 and 8.

4. In combination with the splint A. having the adjusting joint $a^5$, $a^6$, the opposite splint B. having a simple pivot joint $b'$, and made solid at its upper end, all as set forth.

5. In combination with the side splints, the double-cone and its frame cord, the extension bridge 29, and means substantially as described for attaching bands to the limbs of the patient, all as set forth.

6. In combination with the side splints A. B. the movable and removable friction adhering cap-pieces 15* severally provided with hooks, adapted for holding a canvas sling or hammock to, support the leg as set forth.

7. In combination with the side splints, and their foot-pieces as described, the system of straps 59, connected thereto, the trolley 49, with its lower portion adapted to turn on a shaft, and having a pulley 52, and cord 53, which connects these parts to the straps as shown and described, and the trolley adapted to be supported on a bar 46, attached to a bed frame.

8. In combination with the inner and outer splints, the steel plates $a^{13}$, having the curved slotted tongues $a^{14}$, and the slotted extensible thigh piece 11, adapted for adjustable connection to such tongues as set forth.

In witness whereof I have hereunto set my hand this 22d day of August, A. D. 1892.

JOHN T. BERGHOFF.

Witnesses:
L. R. LANCASTER,
M. I. HUMISTON.